United States Patent [19]

Mikaila

[11] Patent Number: 5,458,449
[45] Date of Patent: Oct. 17, 1995

[54] REUSABLE COTTER PIN AND ITS METHOD OF USE

[76] Inventor: Joseph J. Mikaila, 2643 Lake Charnwood, Troy, Mich. 48098

[21] Appl. No.: 283,730

[22] Filed: Aug. 1, 1994

[51] Int. Cl.[6] .................................................. F16B 21/14
[52] U.S. Cl. ............................ 411/514; 411/513; 411/511
[58] Field of Search .................................. 411/515, 514, 411/513, 530, 945, 946; 29/446, 525.1

[56] References Cited

U.S. PATENT DOCUMENTS

| | | | |
|---|---|---|---|
| 502,620 | 8/1893 | Fisher | 411/513 |
| 872,180 | 11/1907 | Hite | 411/513 |
| 2,631,487 | 3/1953 | MacLean, Jr. et al. | 411/513 |

Primary Examiner—Peter M. Cuomo
Assistant Examiner—Tuyet-Phuong Pham
Attorney, Agent, or Firm—Peter A. Taucher; David L. Kuhn

[57] ABSTRACT

A method to attach a cotter pin to a receptor at its through hole includes using a flat slider key whose aperture has surface zones against which the pin's legs bias into a conforming slidable fit. The key is initially remote from the legs' free ends and is oriented perpendicular to a plane defined by the legs. The key is slid along the legs, which are forced toward each other without eliminating the gap therebetween. The key is then pivoted until the legs close so as to fit their free ends into an entry of the receptor's hole. Once the legs' free ends are in the hole, the key is returned to its original orientation. The legs are then passed through the key further into the hole until their free ends exit the hole and spread apart more than hole's width.

8 Claims, 2 Drawing Sheets

5,458,449

REUSABLE COTTER PIN AND ITS METHOD OF USE

GOVERNMENT USE

The invention described here may be made, used and licensed by or for the U.S. Government for governmental purposes without paying me a royalty.

BACKGROUND AND SUMMARY

When a mechanical assembly is taken apart for inspection or repair, cotter pins holding elements of the assembly are often thrown away and replaced. One reason for this practice is to avoid using cotter pins that are fatigued through repeated plastic bending that may sometimes be necessary to properly secure the cotter pins during periodic inspections or repairs.

I solve the above problem via a cotter pin that is a strong, flexible spring that need not be plastically deformed to secure it to a mechanical element. A slider key riding on the cotter pin's legs forces the legs together before these legs enter a hole. The slider key first slides along the legs toward their diverging, free ends to close the legs toward one another. Then the key pivots on the legs to close them together more completely. The key is of simple, inexpensive construction and can act as a lever to help generate the force to squeeze the pin's legs together.

DETAILED DESCRIPTION

Figure 1:
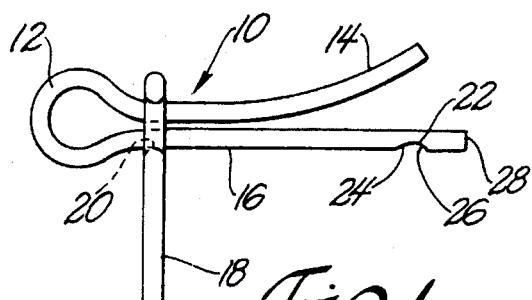
FIG. 1 is a side elevational view of my cotter pin and a slider key thereon.
Figure 2:
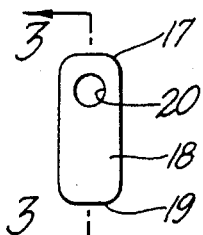
FIG. 2 shows the slider key and FIG. 3 is a view taken along line 3—3 in FIG. 2.
Figure 3:
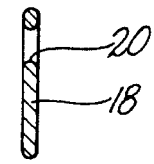

FIG. 1 shows cotter pin 10 in its free state where loop 12 connects curved leg 14 and straight leg 16. The cotter pin can be a strong spring not readily plastically deformed without hand tools, and it may be preferred that the cotter pin be elastically deformable with only tools or machinery. The legs are slightly spaced apart near loop 12 but diverge from each other at their free ends. A flat, somewhat elongate slider key 18 is normal or approximately normal to a general plane defined by the legs, the slider key translating along the legs. Slider key 18 typically has a round aperture 20 (FIGS. 2, 3) fitting conformingly and closely but not tightly around the legs in the FIG. 1 position. The legs bear slidingly against spaced apart, opposed portions of the inner peripheral surface of aperture 20. Preferably, aperture 20 is nearer one end 17 of key 18 than the other end 19, as seen in FIG. 2. The free end of leg 16 defines a notch 22 open away from leg 14, the notch having a first side 24 less sloped relative to leg 16 than a second side 26 of the notch. Side 26 is closer to terminus 28 of the leg 16 free end than is side 24.

Figure 4:
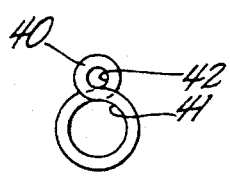
FIGS. 4, 5, 9 and 11 show optional slider keys.
Figure 5:
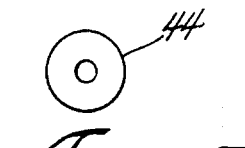
Figure 6:
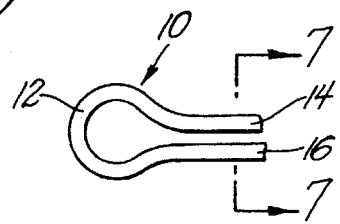
FIG. 6 is a partial side elevational view of the cotter pin.
Figure 9:
Figure 10:
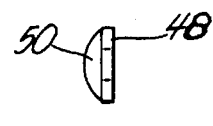
FIG. 10 is a view taken along line 10—10 in FIG. 9.
Figure 11:
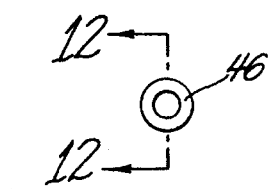
Figure 12:
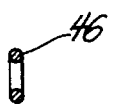
FIG. 12 is a view taken along line 12—12 in FIG. 11.
Figure 13:
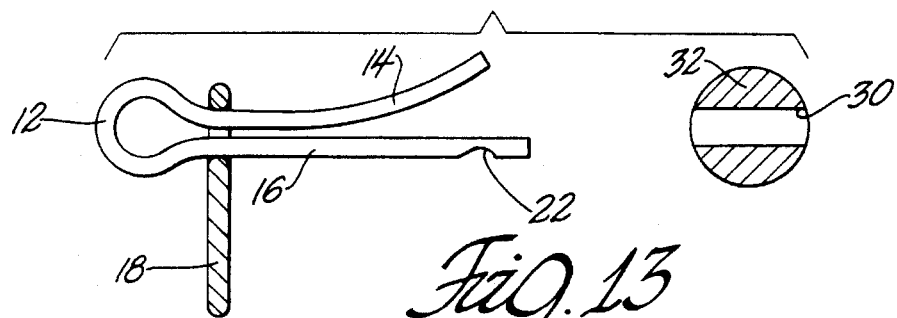
FIGS. 13 through 16 are a progression of partly sectioned side elevational views of the cotter pin and slider key showing the cotter pin being affixed to a shaft 32.

FIG. 4 shows another slider key 40 typically made of round metal stock in an "8" shape to form a larger closed loop 41 that can be used as a lever and a closed loop 42 at one end of key 40 to accept legs 14 and 16. FIG. 5 shows alternate slider key 44 in the form of a flat washer that can replace slider key 18, while FIGS. 11 and 12 show alternate slider key 46 in the form of annular ring that can likewise replace key 18. Slider keys 44 and 46 are used when the spring force of cotter pin 10 is so small that a lever on the slider key is not needed to squeeze the cotter pin's legs, as described later. Still another alternate slider key 48 is shown in FIGS. 9 and 10, that with slider key 48 having an integral gripping tab 50.

Figure 7:
FIG. 7 is a view taken along line 7—7 in FIG. 6 showing the cross sectional shape of the cotter pin's legs.
Figure 7A:
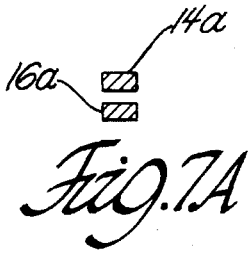
FIGS. 7A and 7B show optional cross sectional shapes for the cotter pin's legs.
Figure 7B:
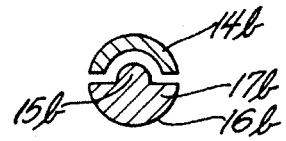
Figure 8:
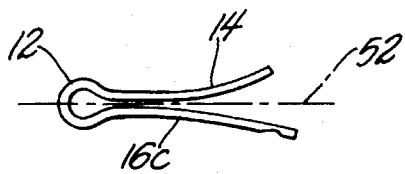
FIG. 8 is a side elevational view of an alternate embodiment of the cotter pin.

FIGS. 7, 7A and 7B show cross sectional shapes of the legs 6 of cotter pin 10, with FIG. 7 showing the normally preferred half circle shapes and FIG. 7A showing rectangular shapes of legs 14a and 16a. FIG. 7B shows the arcuate cross section of leg 14b receiving ridge 15b on half circle portion 17b of leg 16b. FIG. 8 shows a change to cotter pin 10 wherein curved leg 16c replaces straight leg 16 of FIG. 1, so that legs 14 and 16c both diverge from longitudinal axis 52 of the cotter pin.

Figure 14:
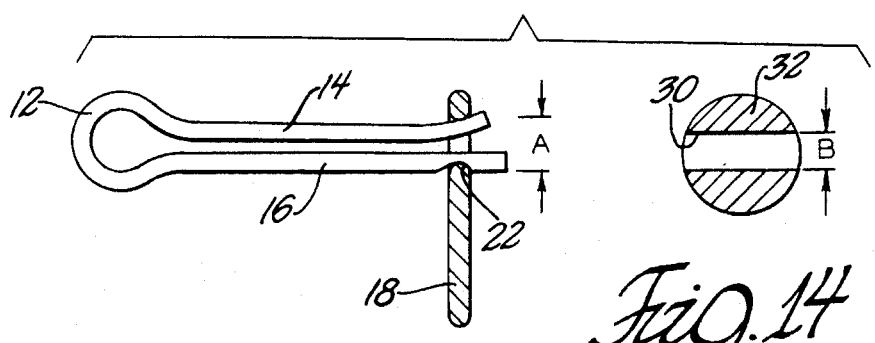

FIGS. 13 through 16 help demonstrate the operation of cotter pin 10 when it engages a through hole 30 in a shaft 32 or similar element. In FIG. 14, slider key 18 has been translated from its FIG. 13 position near loop 12 to a position at notch 22. Leg 14 has been elastically deformed, and the legs are spaced apart along their entire length so that they and the elongate gap between them occupy a dimension "A," which is greater than diameter or width "B" of through hole 30.

Figure 15:
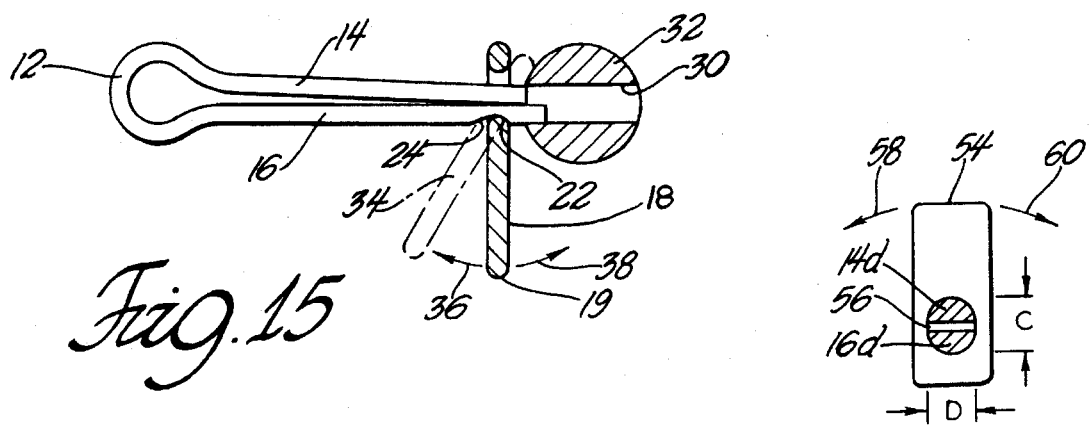
Figure 16:
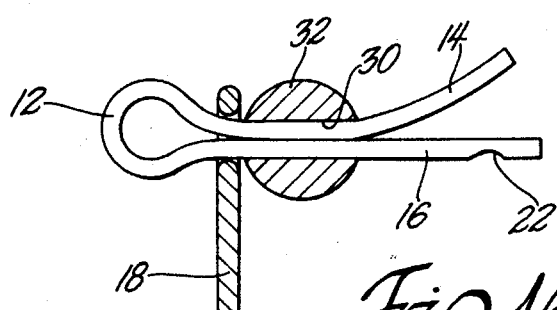

Next, as shown in FIG. 15, slider key 18 is pivoted relative to its connection with the legs at notch 22 in direction 36, to a position indicated at 34 so that the legs are squeezed into contact. The notch keeps key 18 from sliding along the legs when the slider key pivots. Of course, key 18 could also be pivoted in opposite direction 38 to force the legs together. The portion of slider key 18 between aperture 20 and end 19 (FIG. 2) acts as a lever to overcome the spring force of cotter pin 10 if that force is quite strong, as will often be true if cotter pin 10 is used on U. S. Army vehicles. The direction of pivot is not critical so long as slider key 18 remains at least approximately normal to the general plane where loop 12 lies. After legs 14 and 16 are squeezed together, their free ends are inserted through hole 30 and slider key 18 returns to a position normal to legs 14 and 16. Finally, the legs slide through key 18 and hole 30 until the configuration in FIG. 16 is reached.

Figure 17:
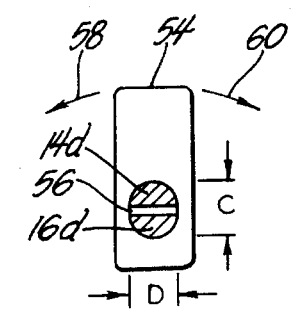
FIG. 17 shows the cross sections of the cotter pin's legs in conforming fit with still another version of the slider key.

FIG. 17 shows a combination of cotter pin legs 14d and 16d with slider key 54 that cooperate in somewhat different fashion than the legs and key shown in FIG. 1. Curved leg 14d is the same as curved leg 14 and straight leg 16d is similar to leg 16 except that leg 16d does not have a notch. Legs 14d and 16d are integrally connected in the same way to a loop such as the legs in FIG. 1 are connected to loop 12. Slider key 54 is in all respects similar to elongate flat slider key 18 of FIG. 2, except that aperture 56 has a major axis of length "C" longer than minor axis of length "D". Legs 14d and 16d fit conformingly and slidably with spaced, diametrically opposed portions of aperture 56 and key 54 is disposed near the free ends of the legs in a position analogous to that of key 18 in FIG. 14. When slider key 54 rotates 90° in angular direction 58 or 60, aperture 56 compressingly cams legs 14d and 16d together to enable them to fit into a bore as at 30 in FIGS. 13 through 16. Slider key 54 will always remain generally normal to legs 14d and 16d, even when it is rotated. The cross section of legs 14d and 16d can be replaced by the analogous cross sections of legs 14b and 16b in FIG. 7B so long as the legs fit conformingly and slidingly against the spaced opposed diameter portions of aperture 56. Likewise, the hole shape of aperture 56 could be utilized on the slider keys shown in FIGS. 4, 5, 9 and 10.

I do not desire to be limited to the exact details of structure or method shown here since obvious changes will occur to those skilled in the relevant arts without departing from the spirit and scope of the following claims.

What is claimed is:

1. A method for attaching a fastener to an element defining a through hole for receiving the fastener, comprising:

providing the fastener with spaced apart legs biased to diverge at free ends of the legs;

providing a key having an aperture;

fitting the legs through the aperture;

locating the key at a first position more remote than a second position from the free ends;

sliding the key along the legs to the second position so as to elastically deform at least one of the legs while allowing the legs to define therebetween an elongate gap along an entire length of the legs;

by pivoting the key, closing the legs sufficiently to fit into an entry end of the through hole and putting the free ends of the legs into the entry end;

passing the legs through the key and the through hole until the free ends pass out of an exit end of the through hole and diverge apart further than the size of the through hole.

2. The method of claim 1 wherein the step of fitting the legs through the aperture includes putting the legs in contact with spaced apart, opposed inner peripheral surface portions of the aperture.

3. The method of claim 1 wherein the step of closing the legs by pivoting the key includes using inner peripheral surface portions of the aperture to compressingly cam the legs toward one another.

4. A method for attaching a fastener to an element defining a through hole for receiving the fastener, comprising:

providing the fastener with a pair of spaced apart, opposed legs biased to diverge at free ends of the legs, each leg having a cross-sectionally arcuate surface faced away from another leg;

providing a flat elongate key having an aperture closer to one key end than another key end, the aperture having a major axis and a minor axis shorter than the major axis;

fitting the legs through the aperture to slidingly conform with spaced apart, opposed inner peripheral surface portions of the aperture;

locating the key remote from the free ends at a generally perpendicular relation to a first plane, which is defined by the legs;

sliding the key along the legs so as to elastically deform at least one of the legs while allowing the legs to define therebetween an elongate gap;

camming the legs toward one another by pivoting the key through an arc in a second plane generally perpendicular to the legs;

pivoting the key until the legs close sufficiently to fit into an entry end of the through hole and putting the free ends of the legs into the entry end;

passing the legs through the key and the through hole until the free ends pass out of an exit end of the through hole and diverge apart further than the size of the through hole.

5. A method for attaching a fastener to an element defining a through hole for receiving the fastener, comprising:

providing the fastener with a pair of spaced apart, opposed legs biased to diverge at free ends of the legs;

providing a key having an aperture;

fitting the legs through the aperture to contact spaced apart, opposed inner peripheral surface portions of the aperture;

locating the key remote from the free ends;

sliding the key along the legs so as to elastically deform at least one of the legs while allowing the legs to define therebetween an elongate gap along an entire length of the legs;

camming the legs toward one another by pivoting the key about the legs;

continuing to pivot the key until the legs close sufficiently to fit into an entry end of the through hole and putting the free ends of the legs into the entry end;

passing the legs through the key and the through hole until the free ends pass out of an exit end of the through hole and diverge apart further than the size of the through hole.

6. The method of claim 5 wherein the step of providing the key having the aperture comprises:

providing the aperture with a major axis; and providing the aperture with another axis shorter than the major axis.

7. The method of claim 6 wherein the step of providing the key with the aperture comprises:

providing a flat elongate key;

placing the aperture nearer one key end than another key end.

8. The method of claim 6 including the step of selecting the inner peripheral surface portions of the aperture to be at opposite ends of the major axis.

* * * * *